United States Patent [19]

Hillenbrand et al.

[11] Patent Number: 4,949,281

[45] Date of Patent: Aug. 14, 1990

[54] METHOD AND APPARATUS FOR GENERATING AND REPRODUCING TWO-DIMENSIONAL GRAPHIC OBJECTS BY POLYNOMINAL PARAMETRIC CURVES

[75] Inventors: Franz Hillenbrand; Klaus Schröer; Frank Rebs; Michael Dlabka; Dietmar Sprenger, all of Berlin, Fed. Rep. of Germany

[73] Assignee: H. Berthold AG, Berlin, Fed. Rep. of Germany

[21] Appl. No.: 183,603

[22] Filed: Apr. 19, 1988

[30] Foreign Application Priority Data

Apr. 23, 1987 [DE] Fed. Rep. of Germany ....... 3713847

[51] Int. Cl.$^5$ .................... G06F 15/62; G06F 15/66
[52] U.S. Cl. .................. 364/518; 364/523; 340/735; 382/22
[58] Field of Search ............ 340/730, 735, 751; 382/22; 364/200 MS File, 900 MS File, 523, 518

[56] References Cited

U.S. PATENT DOCUMENTS

| | | | |
|---|---|---|---|
| 3,576,980 | 5/1971 | Doyle | 382/22 |
| 4,075,695 | 2/1978 | Lelke | 364/200 |
| 4,511,893 | 4/1985 | Fukuda | 340/751 |
| 4,675,833 | 6/1987 | Cheek et al. | 364/518 |

OTHER PUBLICATIONS

W. Newman & R. Sproull, Principles of Interactive Computer Graphics, McGraw-Hill Book Co. (1981), pgs. 309–315.

Theo Pavlidis, Algorithms For Graphics And Image Processing, Computer Science Press (1982), pgs. 247–259, 270–271.

Richard Rubinstein, Digital Typography, Addison-Wesley Publishing Co. (1988), pgs. 122–129.

J. Foley & A. VanDam, Fundamentals of Interactive Computer Graphics, Addison-Wesley Publishing Co. (1982), pgs. 514–523.

Josef Stoer, Einfuhrung in die Numerische Mathematik I, E. Springer-Verlaq 1979, pgs. 76–91.

Primary Examiner—Gary V. Harkcom
Assistant Examiner—Raymond J. Bayerl
Attorney, Agent, or Firm—Basile and Hanlon

[57] ABSTRACT

The invention utilizes polynomials, where the graphic objects are predetermined in the form of reference contours in contour coordinates. The generation process involves subdividing the length of each contour segment into a multiple of curve segments each, preferably a straight line. The coordinate points associated with the respective curve segments are compared with those of the given contour segment and the distance between them is determined. If a predetermined distance between them is exceeded, the coordinate location on the contour segment which is at the greatest distance from the straight line is chosen. A curve defined by the use of parametric spline functions is then laid between the starting and end point and incorporating the chosen base point. At a time when the predetermined distance no longer is exceeded, the base points assigned are stored in a memory. The apparatus contains a central processing unit, a register for storage of the scanned pixel matrix and the outside contours, and a register for storage of the reference contours and the spline data. Corner recognition and filtering circuitry provides the recognition of corners and filtering where the scanned contour is smoothed for determining the reference contour. A step counter and a step register are provided for coordination between the deviation stored in a register and the respective coordinates.

14 Claims, 9 Drawing Sheets

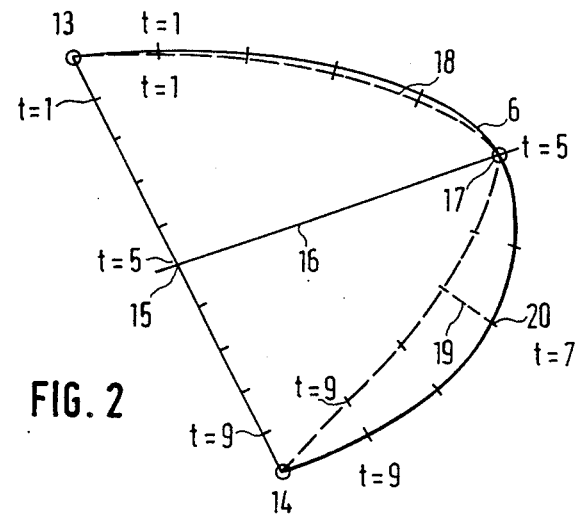
FIG. 2
FIG. 3
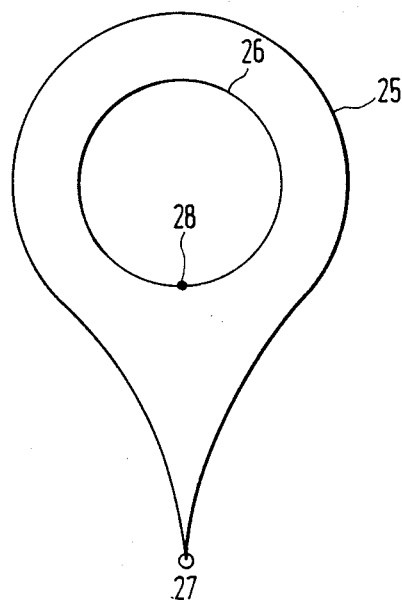

METHOD AND APPARATUS FOR GENERATING AND REPRODUCING TWO-DIMENSIONAL GRAPHIC OBJECTS BY POLYNOMINAL PARAMETRIC CURVES

BACKGROUND OF THE INVENTION

1. Field of the Invention

The subject of the invention is a method and apparatus to generate and reproduce two-dimensional graphic objects for purposes of electronic or electromechanical reproduction.

2. Description of the Relevant Art

German Patentschrift Number DE-AS 24 22 464 teaches a method for the coding of characters for photoelectronic typesetting, and a decoding procedure associated with it. It also describes a character generator to produce the coded characters. The characters are coded as digital numbers based on a standard square corresponding to the coordinates of a starting point for the peripheral lines of the character. The characters are further defined in relation to variable parameters of these peripheral lines, such as the slope and the curvature. This is done by utilizing commands for a change in the curvature. The generation of a straight ascending or descending line, which is based on a command resulting from calculations affecting the slope, however, does require a large memory capacity for a large amount of slope data. This is especially the case when linear inclined line segments are to be generated in continuous fashion as peripheral lines of high quality typographical characters. Therefore, to form a peripheral line with a linear slope, a special command can be provided which involves incremental changes of Y-coordinate values. This special command defines how, starting from a starting point, the Y-coordinate is to be changed for each constant X-coordinate increment. Therefore, the listing of a number of X-increments, i.e., a number of calculation cycles for which a change in the Y-coordinate or the slope or the curvature must be calculated, is associated with each special command. The character generator so described requires a large memory capacity to store slope data from high quality typographical characters and also for the storage of the number of calculation steps which are required by the special commands. In addition, the calculations are relatively time consuming, especially the decoding procedure which requires lengthy calculations.

In addition, it is to be noted that all procedures which define the peripheral lines by means of slopes or curvatures are unstable and poorly based numerically, since they are characterized by unfavorable error propagation characteristics.

German Patentschrift Number DE-PS 29 53 600 describes a typesetter for the automatic generation of characters with the aid of a character storage device which stores the first and second coordinates for each character to be represented with reference to the starting points of two peripheral lines in a standard grid. Furthermore, a large number of linear sequential vectors which are based on the origin of the grid coordinate system and follow each other along the peripheral lines of the character also are stored as digital numbers. These vectors are respectively defined by digital numbers, which respectively define the first and second coordinate distances from the end of one vector to the next. This type of character generation results in poor quality characters, and the quality further deteriorates as the characters are enlarged. At the same time, improving the quality by reducing the length of the vectors significantly increases the amount of data to be processed.

It is the object of this invention to create a method and apparatus for the generation of graphic objects, where smooth aesthetic contours of high quality are generated with a minimum of calculation effort, data storage and memory requirements. It is also the object of this invention to create a method and apparatus where fast character transformation and subsequent decoding are guaranteed.

This objective, as well as further developments and improvements, is realized in accordance with the invention of the present application.

The generated graphic objects are of an excellent quality when using the method according to this invention. Also, only a small amount of data is required. It is of special advantage that a quick transformation of the generated characters is easily possible, and the subsequent decoding can be carried out at great speed.

SUMMARY OF THE INVENTION

The present invention is a novel method and apparatus for the generation of two-dimensional graphic objects for electronic or electromechanical reproduction. This is achieved by the use of polynominals, where the graphic objects are provided as reference contours in contour coordinates. The number of contours per object and the number of contour segments per contour is defined, and the starting and end points of the contour segments are established.

In the method of the present invention, the length of any given contour segment is subdivided into a plurality of curve segments, and the starting and end points of the given contour segment are connected by a defined curve section, preferably a straight line, the length of which is subdivided into the same number of curve segments as the given contour segment. The points of coordinates of the respective curve segments of the straight line and the contour segment are compared with each other, and the distance between them is determined. Upon exceeding a predetermined distance, that coordinate point is chosen which is at the greatest distance from the straight line. With the use of parametric spline functions, a curve is laid through the starting and end point and chosen base point. The resulting curve segment is again subdivided into the same number of curve segments as the given contour segment. The coordinate points of the curve laid are again compared with those of the contour segment, and the distance between them determined. Upon exceeding a predetermined distance, the coordinates of a point on the given contour segment are chosen as a further base point, given the fact that this point, again, is at the greatest distance from the given contour segment. These steps are repeated until the predetermined distance is no longer exceeded.

The present invention also provides a method whereby it is possible to store the chosen base points and the starting and end points of each contour segment and, also, the difference of the curve segments between the base points. Periodic spline functions are used for smooth closed contours, and natural spline functions are used for non-smooth contours.

A reference contour provided by a digital data source, is smoothed by an averaging procedure across neighboring coordinate points. The curve segment distances are standardized in such a way that no gaps arise in the contour for whole-number calculations of the contour points.

In the apparatus of the present invention, a central processing unit (CPU), a register for storage of the scanned pixel matrix and the outside contours, and a register for storage of the reference contours and the spline data are provided. Hardware for the recognition of corners and for filtration is provided, where the scanned contour is smoothed for determining the reference contour. An approximation hardware unit is provided, where the respective reference contour segments are approximated by spline curves. The circuitry for corner recognition and filtering contains two address counters, into which is respectively loaded one of the starting addresses of the scanned outside-contour stored in a register, and one of the starting addresses for the reference contour. For each coordinate, a contour filter for generating averages and differences is provided. A corner filter for the examination of the curvature by means of differences is provided, as well as a sequence controller to control these processes.

Each contour filter is provided with a stack register, into which the assigned coordinate of the complete contour is loaded. It also contains a subtraction logic element for the generation of difference values between the actual coordinates and a coordinate which has been delayed by N-values. It contains an addition element with a register for the generation of flowing sums, and it contains multiple stack registers for storage of the average values which have been delayed by N-steps. It further contains a summation element to sum up the data exiting from various registers.

The contour filter also contains the subtraction logic elements in which differences between the contents of various registers are established, and these differences are forwarded to the corner filter. The corner filter is provided with a multiplier in which the differences of the X or respective Y-contours are mutliplied in crosswise fashion. The products of this multiplication are stored in registers. There is a comparison element to compare the results of these mutliplications with the result of the products of sequentially following Y-differences.

The approximation hardware is provided with logic elements serving as addition circuitry consisting of registers and addition elements. These are the means by which the polynomial coefficients are used to determine the starting values of the coordinate. These coefficients are generated via the microprocessor or respectively from the starting values of the polynomials, as such, and from the differences of the first, second and third order derivatives. Provision is made for comparison circuitry in the approximation hardware. This is to compare the coordinates of the approximating contour with the coordinates of the reference contour which are stored in a register. Any respective deviation is then stored in another register, and the comparison circuitry then compares the deviations of two successive coordinates, the larger deviation being stored in the latter register.

A step counter and a step register are provided which allow for a coordination between the deviation stored in the register and the respective coordinate.

The base points, which are stored for each contour, and which are dependent upon the curved segment of the contour segments between, respectively, two base points, are linearly transformed for each desired dimensional change, compression or expansion, rotation or oblique angle change. With the method of the present invention, using cubic spline functions, given the base points, the coefficients x (t), y (t), of the cubic polynomials are defined. The polynomial coefficients are transformed into starting values which respectively correspond to the value of the function, as such, and the first, second and third differentials at locations T=0. Respectively, for each new coordinate location of the contour segments, new starting values are determined through addition of two different previous starting values.

BRIEF DESCRIPTION OF THE DRAWINGS

A practical example of the method and apparatus according to the invention is further detailed by the drawings in the following description wherein:

FIG. 2 is a contour section of the character shown in FIG. 1 to be generated with a graphic demonstration of the method of this invention;

FIG. 3 is a further character to be generated;

DESCRIPTION OF THE PREFERRED EMBODIMENT

To reproduce graphical objects electronically or electromechanically, e.g., type characters for electronic typesetting, a large number of characters is required for different printing styles. The many characters of a given type are called a font. The characters are stored in coded form, e.g., on a floppy disk or a magnetic tape. For instance, a phototypesetting machine, which may involve a cathode ray tube or a laser source, a recording beam is controlled with reference to the stored and subsequently decoded data, and directed to a photosensitive material.

The objects to be encoded, henceforth referred to as characters, are present in digital form, and the contour lines are defined in terms of reference contours as a series of coordinates of individual contour points. Graphic shapes must first be digitized. The characters must be coded in such a manner that they can be stored without requiring an excessive amount of memory and so that during decoding they can be quickly transformed into the desired shape. In order to transform the characters into a digitized format suitable for the coding procedure according to the invention, during a first step the contours are divided into contour-segments. The starting and end points of these segments are defined either manually or as a function of the change in curvature or the slope in the direction of the x or y-axis.

Figure 1:
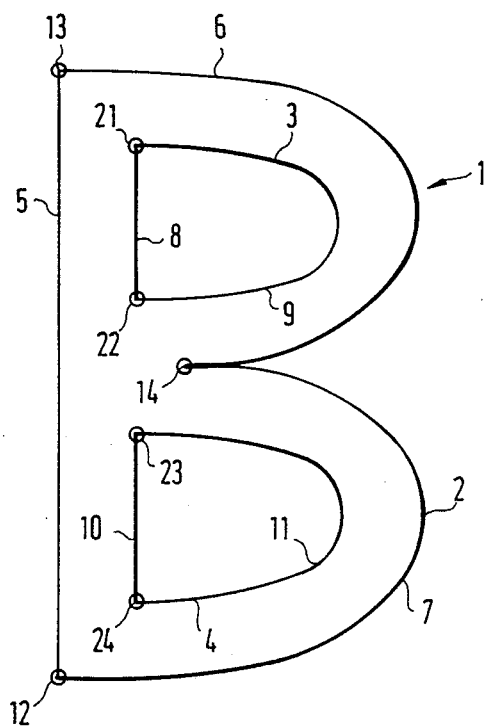
FIG. 1 is a typographical character to be generated.

FIG. 1 shows a character 1 in form of the letter B; it displays an outside contour 2 and two inside contour lines 3 and 4. The outside contour 2 is composed of three contour segments 5, 6, 7, and the inside contour lines 3 and 4, respectively, consist of two contour segments 8, 9; 10, 11. The contour segments are to be constructed through the use of parametric spline functions which connect predetermined end points, or starting points and end points. The starting point for the outside contour 2, for instance, is labelled with the reference number 12 and also serves as the starting point for contour segment 5 with the end point 13.

In accordance with the method of this invention, starting points 12, 13 of the reference contour segment 5 are connected by means of a defined curve segment, preferably by a straight line. Both the reference contour segment 5 and also the straight line are subdivided into an identical number of curve segments, and the respectively assigned coordinate points x(t) and y(t) of the straight line and the reference contour segment are compared with each other. Since, during scanning of the reference contour segment, small deviations from a straight line may occur, a tolerance limit is preset for the comparison of reference contour segment 5 with the straight line which passes through the starting and end points 12, 13. Since the straight line does not fall outside the predetermined tolerance limits, it is recognized as in conformity with the reference contour segment 5, and can be determined as a linear parametric spline function with the starting and end points as base points.

FIG. 2 shows the definition of the second contour segment 6 of contour 2 in greater detail. In this case, the defining starting and end points are 13 and 14. Points 13 and 14 are connected by a straight line 15. Both line 15 and the reference contour segment 6 are respectively subdivided into 10 equal curve segments; this results in the definition of intermediate points x(t) and y(t) with curve segment lengths t=. . . 10. These segments lengths are only shown by way of example, since usually these intermediate points are very close to each other, e.g., the length of the curve segments on reference contour segment 6 can be preset to be 1/20 mm. Beginning at the starting point 13, coordinate points x(t) and y(t) on line 15 and reference contour segment 6 are compared with each other and the straight line distance between them is determined. If this distance is greater than a predetermined distance which defines the error between the reference contour and the contour line to be defined—this is the case for most of the coordinate points of line 15 during the first approximation—the greatest distance between respective coordinate points is determined. In FIG. 2, this greatest distance 16 is associated with the coordinates for curve segment t=5. The coordinates for point 17 on reference contour segment 6 are chosen as a base point for the calculation of a spline curve for which cubic polynomials are used. Spline curve 18 is laid through base points 13, 14, (starting and end point) and the chosen base point 17; its shape alreadly approaches that of reference contour segment 6. This spline curve 18 again is subdivided into ten equal length curve segments and the respectively associated coordinate points x(t), y(t) for curve segments t=0 . . . 10 of spline curve 18 and reference contour segment 6 are again compared with each other. Given any differences, again the largest distance 19 is determined, which in case of the example is found at curve segment t=7. This defines coordinate point 20, which is chosen as a further base point. A new spline curve is then laid through base points 13, 14, 18 and 20. For reasons of clarity, no further curves or respective variances are shown in FIG. 2. The procedure of adding new base points is repeated until the distance between the reference contour section and the last defined spline curve is nowhere larger than the preset error distance.

In this fasion, the reference contour segment 6 can be defined at any time with the aid of cubic spline functions and the base points defined in the procedure.

In similar fashion, the base points for the spline curves for contour segments 7, 9 and 11 are defined, and contour segments 8 and 10 are expressed analogous to contour segment 5 as linear spline functions with the base points 21, 22, and 23, 24.

Although all the data which define the character according to FIG. 1 can be stored, preferably only the base point coordinates $x_s(t)$, $y_s(t)$ and the curve segment distances between two base points are stored. Also stored are such additional identifier codes as are needed for the notification that a new character, or a new contour or contour segment begins.

The contours 25 and 26, shown in FIG. 3, are of a different kind. Specifically in contour 25, the starting point and end point do not smoothly flow into each other. For contour 26, on the other hand, the first derivative at starting and end point 28 is a constant. Contour 25 is designated as a non-smooth contour, contour 26 as a smooth contour. These differences must be taken into account during the definition of the spline curves. This is done by choosing different spline functions. Periodic spline functions are characterized by the fact that their first derivatives at starting and end points are always continuous. Therefore, these functions are always used for the definition of smooth contours. On the other hand, natural spline functions are chosen for non-smooth contours.

Prior to using the above described procedure as such for the generation of the character, each reference contour must be subdivided into the different contour parts. In order to do this, the reference character, which frequently is available in form of a scanned character, is examined with respect to curvature at the contour points and with respect to change of curvature at neighboring contour points. As a function of the curvature data and the change of curvature information, a decision procedure for the recognition of corners is carried out.

If a certain predetermined value for the curvature, assigned for the character or the particular font, is exceeded, this leads to the identification of a corner. It is also possible to recognize corners with obtuse angles, based on their characteristics nature of curve progression. If there are fonts with curving, strongly bent curve segments, these are also identified in order to preclude that corners are being allocated to these contour segments.

In order to speed up the decoding of the generated characters, and in order to provide for storage room the reference contour is examined as to whether continuous contour segments which connect two corner points possibly contain straight line segments. For example, in FIG. 2, the section of the reference contour 6 which is defined by starting point 13 and curve segment t=2 can be considered as a piece of straight line. Depending on the curvature and change of curvature values of sequential coordinate points on the reference contour, straight line segments can be determined; in each case the starting and/or end points are located at the tangential transition points of the straight line to the curved contour section. Given such a preliminary examination of the contours for the existence of straight line segments and localization of their starting and end points, it is only necessary to consider the curved contour sections for the determination of base points for the spline curves.

In addition, during such a preliminary examination of the reference contour for curvature values and change of curvature values, if corners have not been set exactly, they can be automatically redetermined by placing tangents on the contour segments and intersecting them. This procedure can of course also be done manually. Therefore, corners which are less then well defined because of the scanning accuracy of the scanning device, or because of reduced data quality of the source, can be exactly defined.

To achieve a clean reference contour, the contour provided by the scanner is smoothed out by means of an averaging procedure. These procedures employ—given that they are automatically done—so called digital filters. These filters are chosen in relation to the respective task and are of differing lengths and complexity. For example, varying numbers of coordinate points are included; long filters in this case remove the high frequency parts, for example the noise of the scanner. However, it is a fact that long filters impair the ability to recognize corners. Therefore, a comprise must be made between noise suppression (long filter) and good corner recognition (short filter).

The decoding procedure in general has to be a quick process. since, for the example of an electronic typesetting machine, it occurs in the exposure section of the device and thus has to be carried out on-line.

After coding of the characters of a font or set of characters, the data which determine: (a) the information with respect to the number of contours per character; (b) the number of contour segments per contour; (c) starting or respective end point coordinates of the contour segments; (d) base points of the contour segments; and (e) the difference in length of curve segments between two base points, are loaded to a storage medium. The data is then moved, for example, in order to be decoded, to the processor memory of an electronic typesetting machine.

Since only base points and tolerance limits need to be stored, all linear transformations of a character—specifically such transformations which are usual for typographical characters, compression/expansion, rotation, oblique angle—can be carried out with exceptional efficiency and without loss of quality; this is due to the fact that they are carried out prior to the decoding procedure and only involve the parameters stored as the character code (base points and tolerance limits). This also assures that during the subsequent contour calculations only those calculation steps have to be carried out which are absolutely required, given the dimension of the character. Since, for such character transformations, only polynomial defining parameters are used, and not the sequence of contour points, these procedures are very effective, and arbitrary dimensional changes can be done without loss in quality. With the aid of two systems of linear equations, which respectively calculate the second derivatives of the cubic spline functions, by predefining the base points $x_s(t)$, $y_s(t)$, the coefficients of the cubic polynomials $$x(t) = at^3 + bt^2 + ct + d$$

$$y(t) = a't^3 + b't^2 + c't + d$$

for the respective curve segments are defined. To determine the contour coordinates, the values of the polynomials are calculated for locations which are a whole number mutliple of the predetermined minimal stepwidths. For this, a procedure is employed which is based on a matrix presentation of the polynomial under consideration. The matrix representing the polynomial can be transformed by means of a Jordan Transformation so that it only contains entries which are either equal to 1 to 0. This allows for an evaluation of the polynomial in fixed step-widths through simple additions, which are formally described by repeated multiplication of a starting vector with the described matrix. For a cubic polynomial for $t=0$, this requires four starting values, which in turn can be determined from the value of the polynomial, or respectively from the values of its differentials (1., 2., and 3. differential) at location $t=9$, since:

$$x(t) = \dddot{x}(o)/6 * t^3 + \ddot{x}(o)/2 * t^2 + \dot{x}(o) * t + x(o)$$

where $\dddot{x}(o)$, $x(o)$, $\ddot{x}(o)$, $\dot{x}(o)$ stand for the values of the functions and their derivatives at location $t=0$.

Since only fast whole number additions are used, and since the values of the polynomial function are sequentially needed in the exposure unit, the procedure for decoding the contour points is extraordinarily time efficient with the use of the stored parameters of the generated characters; this allows for a rapid definition of the contour of the character, which is then made available to the exposure unit of the electronic typesetting machine in form of a bit map.

Based on the fundamental procedure of the process according to the invention, and by means of suitable standardization of the curve parameters, it is assured that no gaps can arise for the described calculation of whole number contour points.

In the practical example described, after generating the characters, essentially only the base points of the spline which represent the contour segments are stored. Naturally, it is possible to also store the coefficients of the polynomials or the starting values. This, however, would have the disadvantage of requiring considerably more storage volume and entails a larger calculation effort for transformation of the characters, e.g., for their rotation, compression, expansion or the like.

Figure 4A:
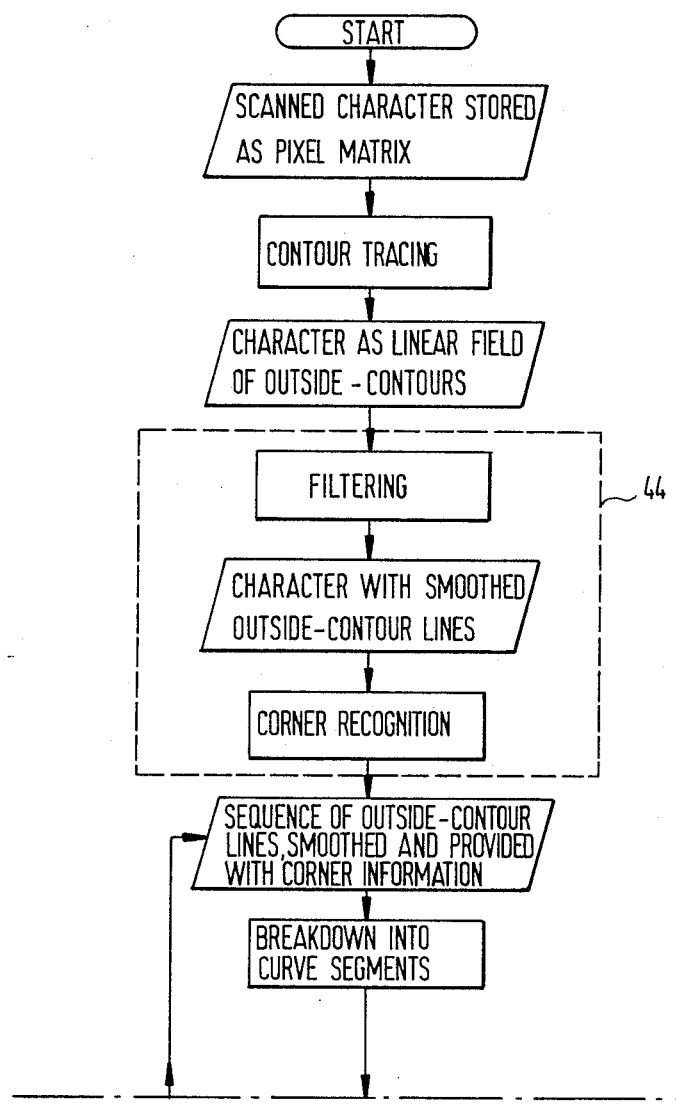
FIGS. 4A and 4B are flowcharts for the method according to this invention.
Figure 4B:
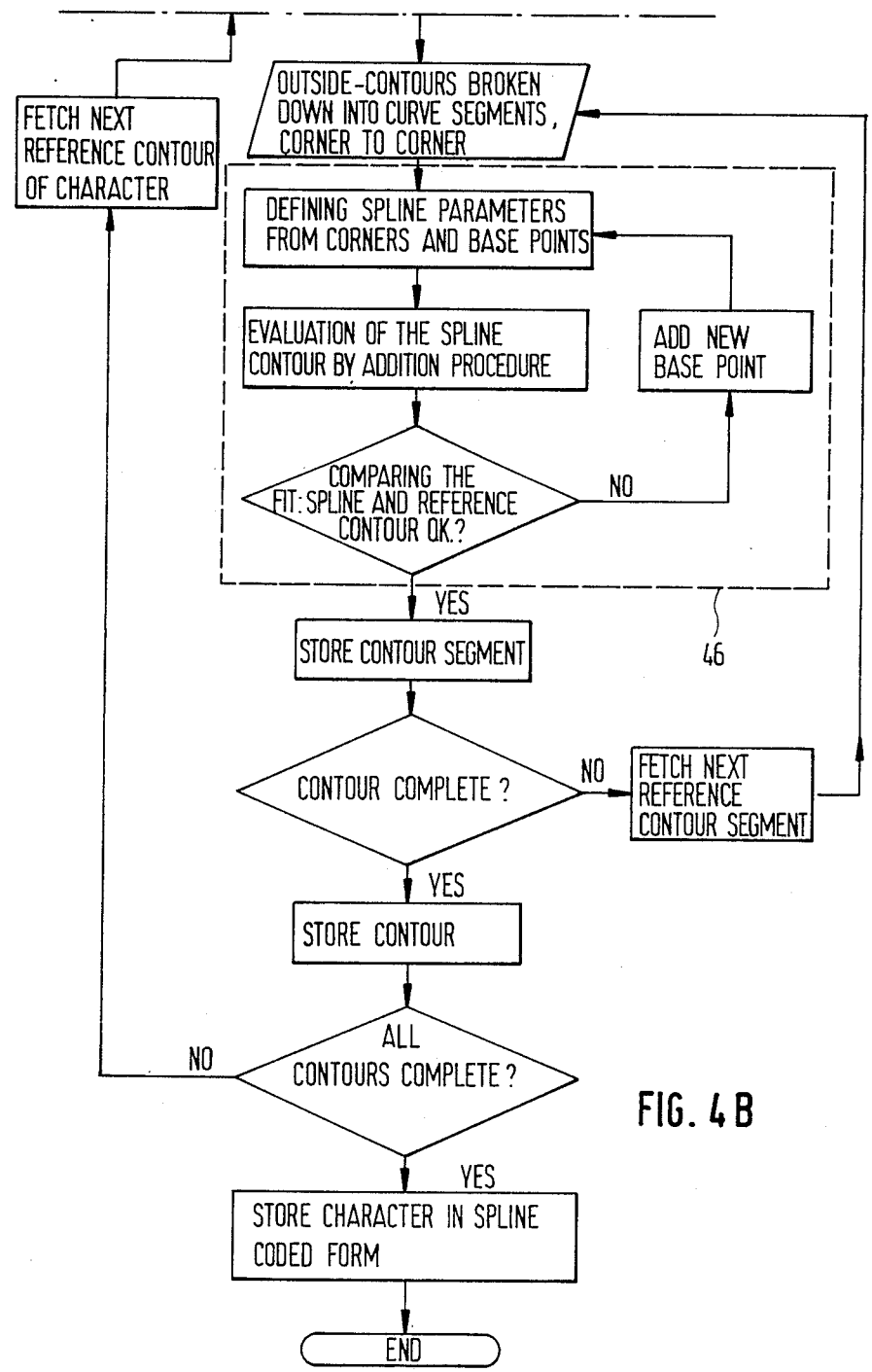

An example of the procedure for generating objects, in operation, shall be summarized using the example of a flow chart (FIGS, 4A and 4B). To generate a character, it is first scanned from the original, and the resulting pixel matrix is stored in register 42 (see FIG. 5). With the aid of the CPU, a "conductor tracing" procedure is then carried out, which produces a field of linear outside contours from the stored pixel matrix. These outside contours may contain unwanted contour points which are eliminated by a subsequent filtration process. In addition, the information concerning corners has to be added. Both the filtration process and the recognition of corners are carried out by the special circuitry 44 (see FIGS. 4 and 6). The thus generated smoothed outside contours and the corner information are then used as the original or reference contour for the purpose of producing an approximating spline-contour and to determine the spline-coefficients necessary to do this.

Figure 9:
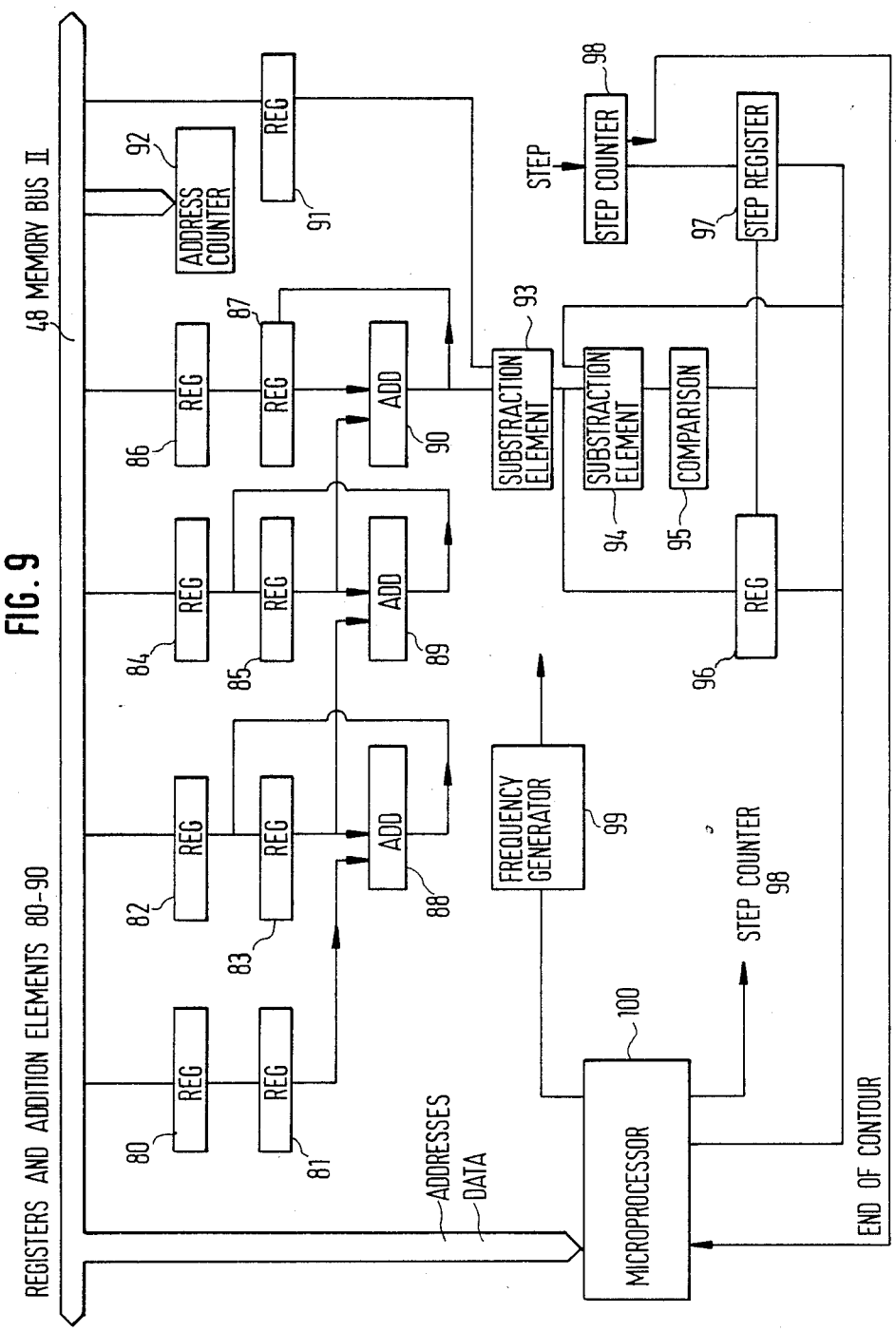
FIG. 9 is a block diagram of the approximation circuitry.

The spline-coefficients are defined by a testing process, in the manner described above, by placing a straight line through the respective corner points. With the aid of this straight line, a contour is calculated and compared with the reference contour. At the same time, the maximum deviation is determined. This maximum deviation then becomes the location for a further base point of the curve, given the fact that the deviation is larger than the predetermined minimum deviation. Based on these newly generated base points, new spline parameters are calculated, and the comparison procedure is repeated, and, if necessary, at the point of maximum deviation, a further base point is defined. The process is complete when further base points are generated which show deviations which are smaller than the predefined value. This approximation procedure is carried out with the aid of the approximation circuitry 46, as shown in FIG. 9, and later described in further detail. In this manner, a contour segment which extends from one corner to the next is completely approximated. Should the total contour consist of several segments, i.e., should several corners be present, the next segment is considered and approximated in the same fashion. Once all contour segments have been so processed, the total contour is complete, and can then be stored as a whole. This is then followed by similarly treating any additional contours of the character until the approximation process is complete and the character is available as a whole in spline-coded form.

Figure 5:
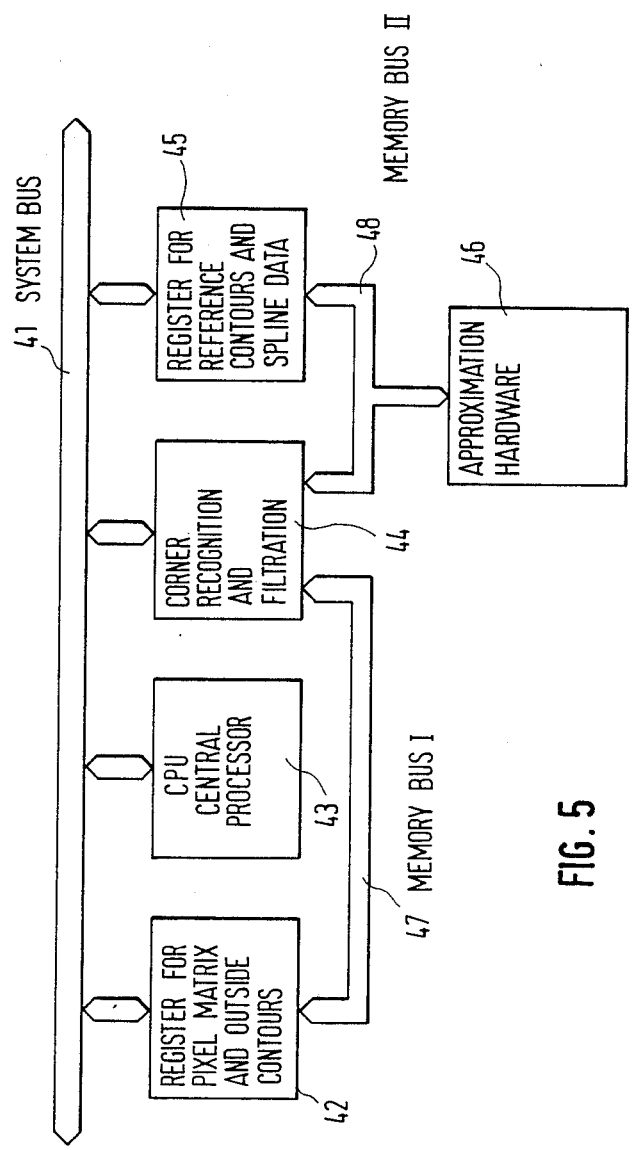
FIG. 5 is a block diagram of the device in accordance with this invention for the generation of two-dimensional graphical objects.

FIG. 5 shows a device for generating objects. The process of generating and reproducing two-dimensional objects can be carried out in accelerated fashion if a suitable device is used for the process. FIG. 5 presents the necessary circuitry as a block diagram; it consists of a CPU 43, which controls all other functions, and two storage registers. Register 42 contains the pixel data generated by means of the scanner and also the outside-contours produced therefrom. Register 45 contains the smoothed contour produced by the circuitry for corner recognition and filtration (44) and also the final spine-data.

Figure 6:
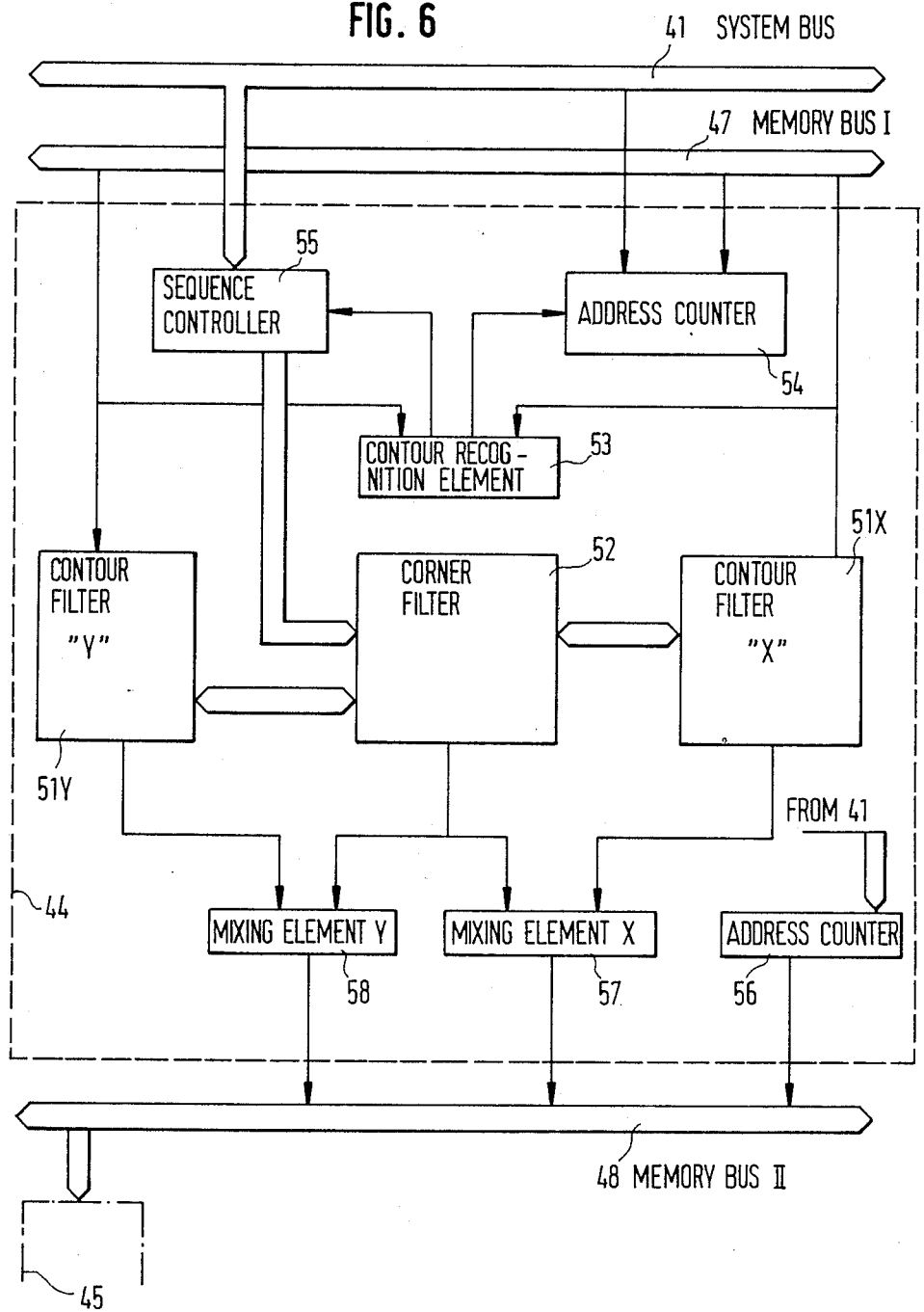
FIG. 6 is a block diagram of the circuit diagram for corner recognition and filtering.

Furthermore, the outside-contours stored in register 42 are processed and smoothed by the circuitry for corner recognition and filtration (44), as will be further detailed in FIG. 6, so that in register 45 a reference contour is stored which is free of unwanted contour points and does contain the data specifying the corner information. The approximation hardware 46, which will be further detailed in FIG. 9, makes use of the smoothed contour information and the corner information which is stored in register 45. It then generates from that information the spline-data, i.e., the necessary coefficients and other information, to define the corners and starting points for a spline curve. All registers and circuits are connected by means of the system-bus 41 and are controlled by CPU 43. In addition, the corner recognition and filtration circuitry 44, the approximation hardware 46, and the reference contour register 45 are connected via memory-bus II 48.

Figure 7:
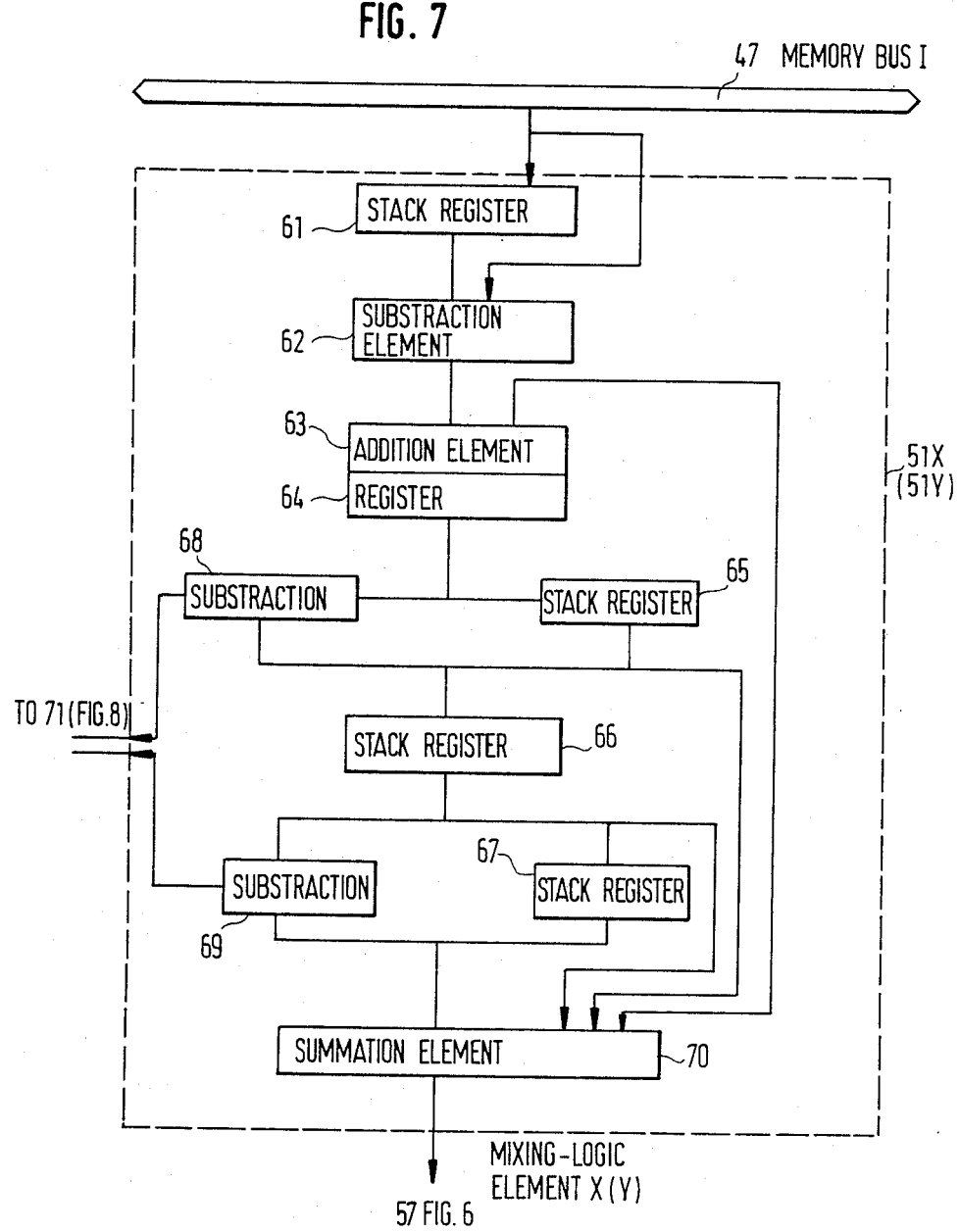
FIG. 7 is a block diagram of a contour filter in accordance with FIG. 6.

Smoothing, corner recognition, and filtering is carried out with the hardware 44, see FIG. 6. The circuitry contains an address counter 54, which is set to the starting address via the system bus so that the starting address corresponds to the address of the contours in register 42. A further address counter 56 is present which is loaded with the starting address of the resulting smoothed-contour, also called the reference contour. The complete circuit is controlled by sequence controller 55, which in turn is initialized via system bus 41. The smoothing process proceeds by address counter 54 independently loading an address to memory bus I 47 and calling for a corresponding contour coordinate (either x or y) from register 42, which is then loaded into contour filters 51x, 51y. In contour filter 51x a number of sequential contour points are added to each other and an average is generated; contour filter 51y works in the same way. Thus, four sequential partial sums are generated. Then, smoothed difference values are formed from these partial sums, together with an average of all four partial sums. These averages are then passed on the register 45 via memory bus II 48 with the aid of mixing elements 57 and 58 and address counter 56. Since this data also contains information concerning the starting point of the contour, apart from the coordinates as such, the start of the contour is determined by means of contour recognition element 53. A beginning or end of a contour, address counter 54 is stopped, and the values located at the respective starting or end address are repeatedly loaded into contour filters 51x or 51y, which solves the problem of the starting or end values for the filtering process. The total process proceeds as follows, the individual contour points of the X or respective Y-coordinates are sequentially loaded into contour filters 51x, or respectively 51y, where the corresponding average values are calculated. In addition, via the differential coefficients, and with the aid of corner filter 52, the curvature is continuously determined, and a finding is made whether a corner is present in the contour or not. If a corner is found, the pertinent information is added to the averaged contour data at the exits of 51x or 51y; the averaged contours are then stored in the register for reference-contours and spline data, 45, via memory bus II 48. Mixing elements 57 and 58 are involved in this process. FIG. 7 details the contour filter for 51x, 51y, which allows for the generation of the average values and the differential coefficients of the loaded coordinates in X or Y-direction. The X or Y-coordinates of contour points are sequentially loaded to stack-register 61 and from the actual value is then substracted the value which is delayed by N-values (exit of stack register 61) in subtraction element 62. The increment resulting from this is added to the content of a register 64. This is then stored in register 64. In this manner, a flowing sum is generated, which combines the values of stack register 61. In stack registers 65, 66 and 67 the resulting average values are delayed by N-steps. By subtracting the values exiting from the stack registers, or respectively, the exit data from addition register 64, difference values are obtained with the aid of subtraction elements 68 and 69; these are needed for recognizing contour corners. The summation of all stack register exit data, or respective exit data from register 64, is done via summation element 70, so that, at the exit of 70, an average value is obtained which contains all four partial sums which are available in registers 64, 65, 66 and 67.

Figure 8:
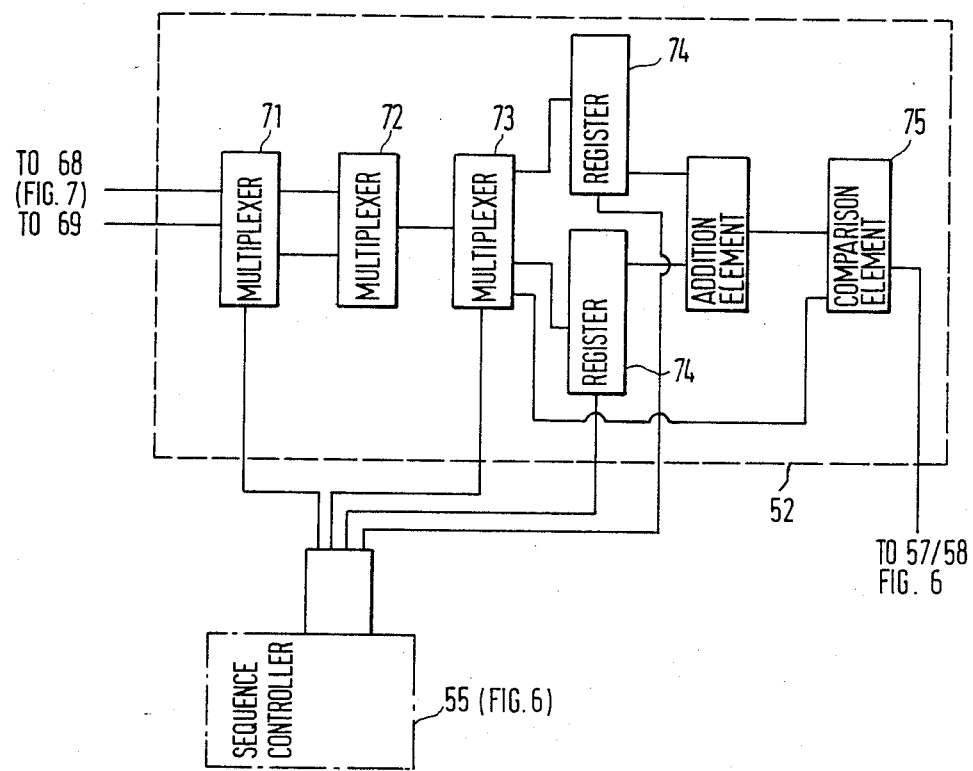
FIG. 8 is a block diagram for a corner filter in accordance with FIG. 6.

FIG. 8 details a circuit for the corner filter 52 according to FIG. 6. To recognize corners on contours, two sequential averaged differences of the X or Y-contour are used. With the aid of these differences, an expression is generated which approximates the radius of curvature. This is done by means of corner filter 52. Here, the differences of the X or respective Y-contour are multiplied with each other in cross-wise fashion and compared to the product of the sequentially following averaged differences in the Y-direction. The multiplication is done with the aid of multiplication element 72. The multiplication results are stored in registers 74 and then compared with the results of the product of the sequential Y-differences in comparison element 75. This process is controlled by sequence controller 55 (FIG. 6). This controller 55 causes multiplexers 71 and 73 to calculate the corresponding products sequentially and is also responsible for their storage in registers 74.

FIG. 9 depicts in further detail the approximation hardware, but only addresses the case of one coordinate. With the aid of this circuitry, and for given spline coefficients, a curve representative of these values is calculated using the registers and addition elements numbered 80 to 90. Furthermore, the deviation from the reference contour, which is stored in register 91, is defined by means of the difference generator 93. The above described procedure is also employed in this case to define the coordinates of the curve which is defined by the spline-coefficients. The procedure, again, is based on a matrix representation of the polynomial in question, and the matrix is suitably transformed by means of a Jordan Transformation. This allows definition of the coordinates in defined step-widths by a simple addition of starting values. By means of the subtraction logic element 94 the comparison logic element 95, and register 96, the maximum deviation between the curve and the reference contour is found, and the parameter value associated with this maximum deviation is stored in register 96. Microprocessor 100 then calculates from the previously available values and the maximum deviation, or respectively, the associated parameter value, the spline coefficients for an improved approximation. If the coefficients for an approximating curve are in hand, microprocessor 100 will load them into registers 80, 82, 84 and 86, and also stores them in registers 81, 83, 85 and 87. Using the addition logic elements 88, 89 and 90, a continuous multiple summation is carried out. Then, in difference generator 93, the result of this summation is compared with the reference contour by taking the difference between the two. This difference, which indicates a deviation, is compared with the deviation from the previous step. If the difference is larger than the previous one, it is stored in register 96. Simultaneously, the associated step, counted by step counter 98, is also stored in step register 97. If the deviation is larger than the previous one, the associated parameter value, which is found in step counter 98, is also stored in register 97. This procedure is repeated until step counter 98 has completed running, i.e., until the curve defined by the spline coefficients has been completely compared with the reference contour. Microprocessor 100 reads the results in registers 96 and 97, compares the maximum deviation stored in register 96 with a preset value, and, should it be larger than allowable, assigns a new contour base point. With this new base point, and the already existing point, new spline coefficients are calculated and later loaded to registers 80 to 86. It is possible to carry out the calculation of the new spline coefficients by microprocessor 100 parallel to the calculation of another contour. This is possible because the contour is independently calculated with the aid of registers and addition logic elements 80 to 90, and because, by means of address counter 92, the reference contour can be independently brought in for comparison via memory bus 48. These parallel calculations result in a special speed advantage obtained from this pipeline structure.

The circuitry, consisting of registers and addition logic elements 80 to 90, serves as an exceptionally high speed device in the decoding procedure, where the contour points are then generated. Thus, for the described generation of a contour, an especially fast decoding process of the coded objects is achieved.

What is claimed is:

1. A method for generating two-dimensional graphic objects for electronic or electromechanical reproduction by the use of polynomials, where the graphic objects are provided as reference contours in contour coordinates, and where the number of contours per object and the number of contour segments per contour is predetermined, and where the starting point and the end point of the contour segments are established, the method comprising the steps of:
   (a) subdividing the length of any given contour segment into a plurality of curve segments;
   (b) defining the starting point and the end point of the given contour segment;
   (c) connecting the starting point and the end point of the given contour segment by a defined curve section, the length of which is subdivided into the same number of curve segments as the given contour segment;
   (d) comparing the coordinate points of the respective curve segment of the defined curve section and the contour segment with each other;
   (e) determining the distance between the coordinate points of the defined curve segment and the contour segment;
   (f) choosing a base coordinate point, when the distance between the coordinate points of the defined curve segment and the contour segment exceeds a predetermined amount, which is at the greatest distance from the defined curve segment;
   (g) laying a resulting curve through the starting point and the end point and the base point with the use of parametric spline functions;
   (h) again subdividing the resulting curve segment into the same number of curve segments as the given contour segment;
   (i) comparing the coordinate points of the resulting curve with the coordinate points of the given contour segment;
   (j) determining the distance between the coordinate points of the resulting curve and the contour segment;
   (k) choosing a further base point, when the distance between the coordinate points of the resulting curve and the contour segment exceeds a determined amount, which is the greatest distance from the the given contour segment; and (l) repeating steps g through k until the predetermined distance amount is no longer exceeded.

2. The method of claim 1 further including the step of storing the chosen base points and the starting points and the end points of each contour segment and, also, the difference of the curve segments between the base points.

3. The method of claim 1 further including the step of employing periodic spline functions for smooth closed contours.

4. The method of claim 1 further including the step of employing natural spline functions for non-smooth contours.

5. The method of claim 1 further including the step of smoothing a reference contour provided by a digital data source by an averaging procedure across neighboring coordinate points.

6. The method of claim 1 further including the steps of reproducing two-dimensional graphic objects comprising the steps of:
   linearly transforming the base points which are stored for each contour and which are dependent upon the curve segments of the contour segments between two respective base points for each desired dimensional change with the aid of cubic spline functions and the given base points to define the coefficients x(t), y(t) of the cubic polynomials;

transforming the polynomial coefficients into starting values which respectively correspond to the value of the function and the first, second and third differentials at a location t+0; and respectively determining new starting values for each new coordinate location of the contour segment through the addition of two different previous starting values.

7. An apparatus for generating two-dimensional graphic objects for electronic or electromechanical reproduction by the use of polynominals where the graphic objects are provided as reference contours in contour coordinates, and where the number of contours per object and the number of contour segments per contour is predetermined, and where the starting point and the end point of the contour segments are established, the apparatus comprising:

central processing means;

means, responsive to the central processing means, for scanning an original character;

first storage means, responsive to the output of the scanning means, for storing the scanned pixel matrix and the outside contours of the original character;

second storage means, response to the output of the scanning means, for storing reference contours and spline function data;

means for recognizing the corners of each character and for filtration of outside contour points of the character to smooth out the scanned contour for determining the reference contour; and approximation means for approximating the reference contour segment.

8. The apparatus of claim 7 wherein the corner recognition and filtration means comprises:

first address counter means, connected to the first storage means, for storing the starting address of the scanned outside contour stored in the first storage means;

second address counter means for storing the starting address of the resultant smooth reference contour;

first and second contour filter means for generating the average and difference values, respectively, of the coordinates of a plurality of sequential contour points;

a corner filter for recognizing the corner of a contour; and sequence controller means, responsive to the central processing means, for operating the corner recognition and filtration means.

9. The apparatus of claim 8 wherein each of the first and second contour filter means comprises:

first stack register means for temporarily storing the coordinate of each contour point;

subtraction means, connected to the first stack register means, for subtracting a value delayed by N-value from the value stored in the first stack register means;

register means for storing partial flowing sums;

adder means for adding the increment output from the subtraction means to the output of the register means;

second, third and fourth stack register means for storing average values each of which has been delayed by N-steps, respectively; and summation means for suming the outputs of the register means and of the second, third and fourth stack register means.

10. The apparatus of claim 9 wherein each contour filter further comprises:

subtraction means for generating differences between the contents of the register means and the first stack register means and the third and fourth stack register means, respectively, which correspond to generated average values which are input to the corner filter.

11. The apparatus of claim 10 wherein the corner filter comprises:

multiplier means, responsive to the sequence controller means, for multiplying the differences of the x and y contours with each other in a crosswise fashion;

storage means for storing the resulting crosswise multiplication products; and comparator means for comparing the resulting crosswise multiplication products with the resultant product of the sequential y-coordinate differences.

12. The apparatus of claim 7 wherein the approximation means comprises:

logic means, responsive to the central processing means, for generating the starting values of the coordinates of each contour point.

13. An apparatus for generating two-dimensional graphic objects for electronic or electromechanical reproduction by the use of polynomials where the graphic objects are provided as reference contours in contour coordinates, and where the number of contours per object and the number of contour segments per contour is predetermined, and where the starting point and the end point of the contour segments are established, the apparatus comprising:

central processing means;

means, responsive to the central processing means, for scanning an original character;

first storage means, responsive to the output of the scanning means, for storing the scanned pixel matrix and the outside contours of the original character;

second storage means, responsive to the output of the scanning means, for storing reference contours and spline function data;

means for recognizing the corners of each character and for filtration of outside contour points of the character to smooth out the scanned contour for determining the reference contour; and approximation means for approximating the reference contour segment, the approximation means including logic means, responsive to the central processing means, for generating the starting values of the coordinates of each contour point, the logic means comprising:

reference contour storage register means for storing the coordinates of the reference contour;

comparison means for comparing the coordinates of the approximating contour with the coordinates of the reference contour; and deviation storage register means for storing the deviation between the coordinates of the approximating contour and the coordinates of the reference contour;

the comparison means comparing the deviations of the two successive coordinates and storing the largest deviation in the deviation storage register means.

14. The apparatus of claim 13 further including:
step counter means; and
step register storage means for storing the associated contour parameter value.

* * * * *